United States Patent
Yoshida

[11] Patent Number: 5,959,654
[45] Date of Patent: Sep. 28, 1999

[54] IMAGE RECORDING METHOD AND APPARATUS

[75] Inventor: Futoshi Yoshida, Kanagawa, Japan

[73] Assignee: Fuji Photo Film Co., Ltd., Kanagawa, Japan

[21] Appl. No.: 08/954,827

[22] Filed: Oct. 21, 1997

[30] Foreign Application Priority Data

Oct. 22, 1996 [JP] Japan ................................. 8-279556

[51] Int. Cl.⁶ ................................. B41J 2/47; B01D 9/00
[52] U.S. Cl. ........................ 347/238; 347/241; 347/242; 347/256
[58] Field of Search ................................. 347/238, 240, 347/232, 241, 254, 242, 256, 257

[56] References Cited

U.S. PATENT DOCUMENTS 5,488,404 1/1996 Fleck et al. ............................... 347/238
5,712,674 1/1998 Doi ........................................... 347/238
5,754,218 5/1998 Baek et al. ............................... 347/240

Primary Examiner—N. Le
Assistant Examiner—Lamson D. Nguyen
Attorney, Agent, or Firm—Sughrue, Mion, Zinn, Macpeak & Seas, PLLC

[57] ABSTRACT

The present invention allows output of image data without change when input image data and image data to be outputted have different resolutions and also allows reduction in a processing time and improvement in operating efficiency by providing an image recording apparatus. Some of lenses which form a telecentric lens system (optical system) are provided such that positions thereof in a direction along an optical axis can be varied by drive of a pulse motor 10. Due to the movement of these lenses, an imaging spot diameter on a photosensitive material is varied. The spot diameter is varied based on a resolution of the input image data. When the resolution of the input image data is lower than a previously set resolution, with the volume of the image data being left unchanged and the imaging spot diameter being increased, the previously set resolution is varied and recorded.

10 Claims, 8 Drawing Sheets

FIG.6A
FIG.6B
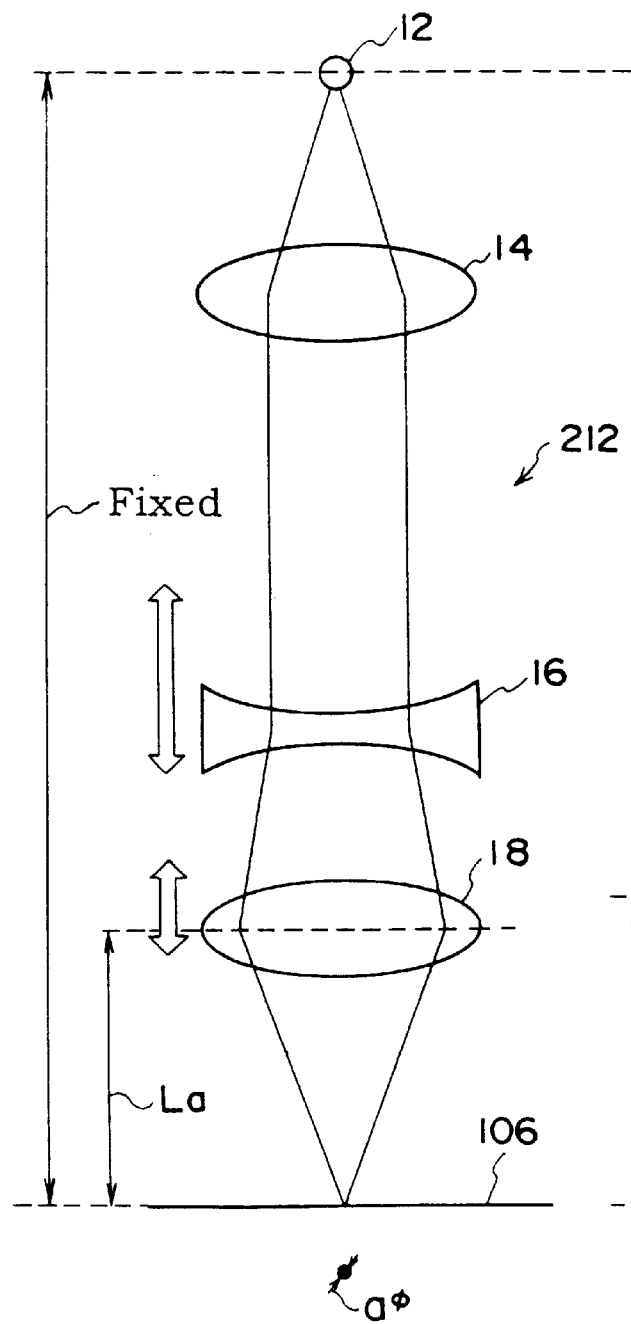
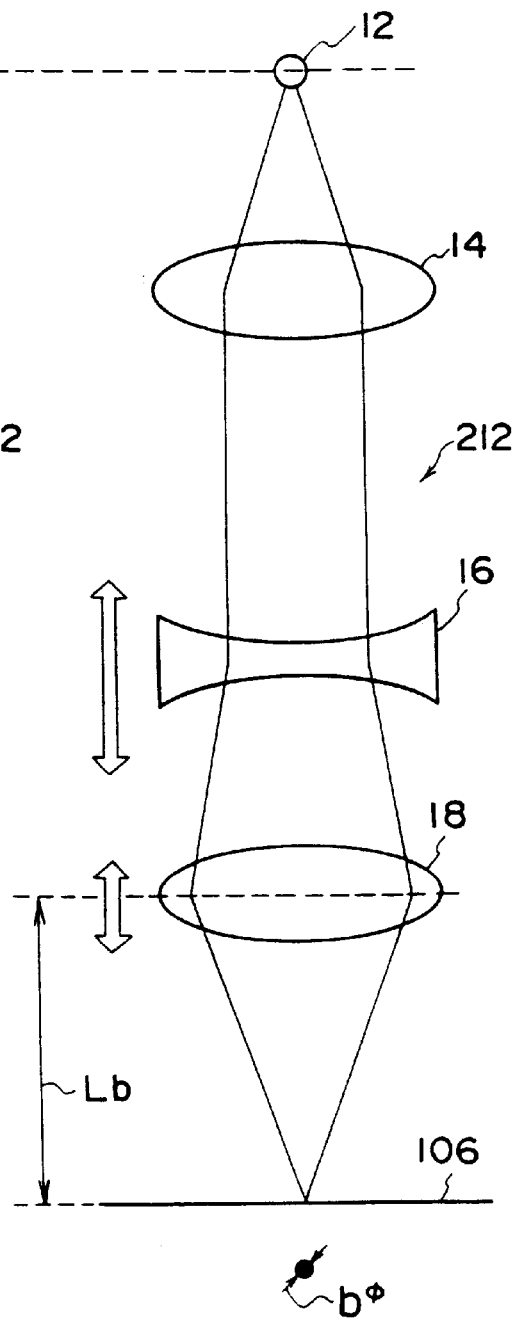

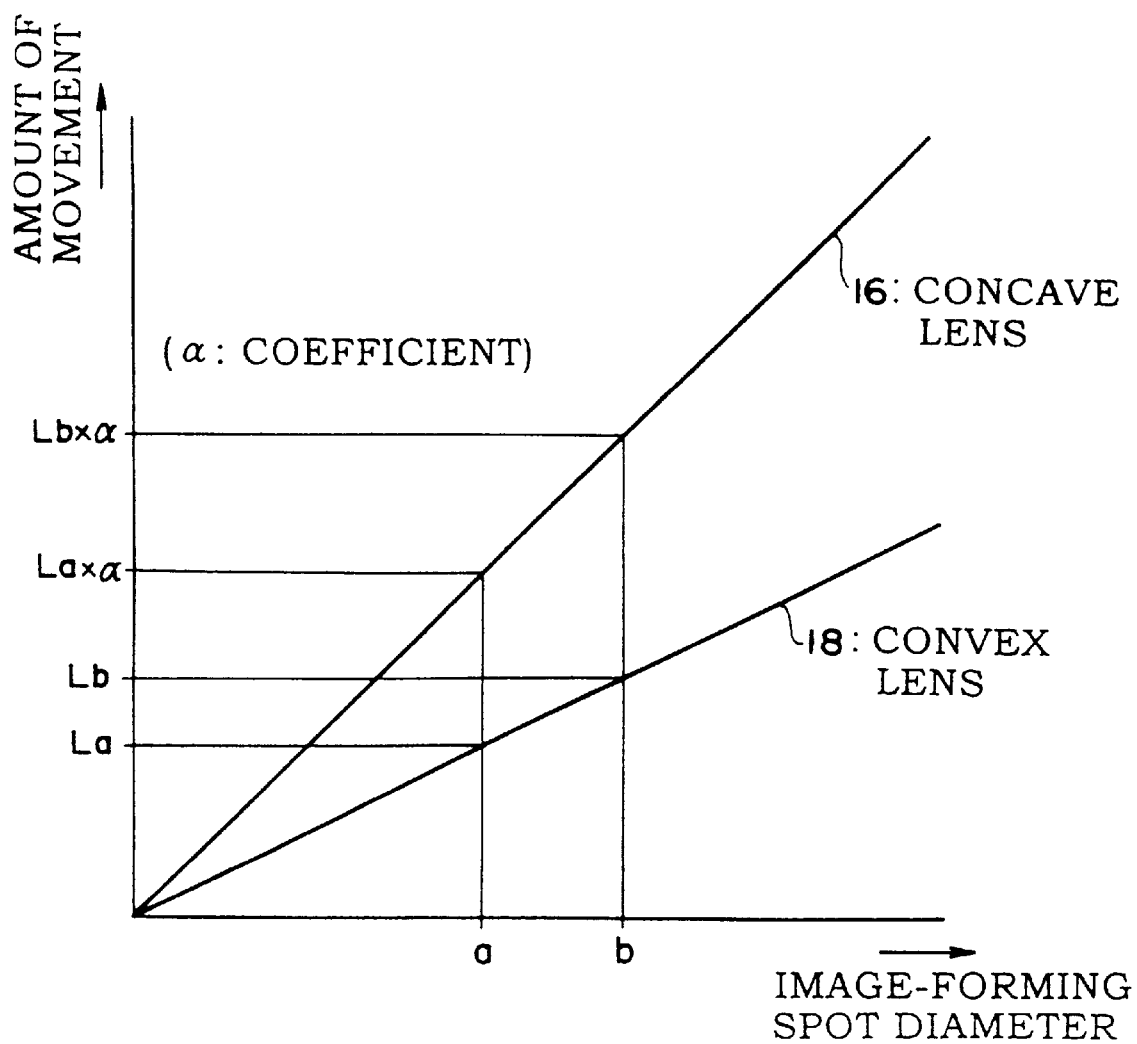

IMAGE RECORDING METHOD AND APPARATUS

BACKGROUND OF THE INVENTION

1. Field of the Invention

The present invention relates to an image recording apparatus which allows an image to be recorded on a photosensitive material by an original image data signal by controlling light of three colors emitted from a light source, and a recording method in the image recording apparatus.

2. Description of the Related Art

A number of image recording apparatuses each having a digital exposure system mounted thereon has been nowadays developed. Generally, in the digital exposure system, an image is recorded on a recording medium in such a manner that a light beam outputted from a semiconductor laser carries image data and the light beam is deflected by high-speed rotation of a polygon mirror (main scanning), and further the light beam reflected by the polygon mirror is subjected to sub-scanning with a galvano mirror or the like, or the above main scanning is effected repeatedly while moving the recording medium (or moving the recording medium stepwise). Here, as the recording medium, a photosensitive drum electrified by corona discharge, a photosensitive material, or the like may be used. Further, in place of the semiconductor laser, other light emitter such as an LED may be used as a light source.

On the other hand, the resolution of an image to be recorded on a photosensitive material depends on the diameter of a spot to form an image (hereinafter referred to just "an image-forming spot") in either case of a semiconductor laser and an LED.

The diameter of the image-forming spot (hereinafter referred to an "image-forming spot diameter" or just a "spot diameter") is set by an image-formation optical system on an optical path and is basically set in accordance with the maximum resolution.

Here, when an image data signal whose resolution is different from that of an image recording apparatus is inputted, the resolution of the image data signal needs to coincide with that of the image recording apparatus by interpolating or sampling the inputted image data.

In this case, however, it is necessary to vary the input image data. For this reason, a lot of time is required for image processing and operating efficiency thereby deteriorates. Particularly, when an interpolating operation or the like is effected, the time for image recording remains unchanged irrespective of a small volume of image data.

SUMMARY OF THE INVENTION

In view of the above-described circumstances, it is an object of the present invention to provide an image recording apparatus which, when each resolution of input image data and image data to be outputted is different from each other, can output the image data without change, thereby resulting in reduction of a processing time and allowing improvement in operating efficiency, and also provide a recording method in the image recording apparatus.

A first aspect of the present invention is an image recording apparatus in which an image is recorded on a photosensitive material by controlling emission of light of three colors from a light source with an image data signal, comprising: the light source which is composed of LED chips of three colors each having a different light-emission peak wavelength, which LED chips being mounted onto a common substrate in a form of a straight line including one or more than one LED chips of each of the three colors therein; an optical system for forming an image of the light from the LED chips of the three colors, having a spot diameter corresponding to a preset resolution on the photosensitive material; a main scanning drive system which moves a unit, in which the light source and the optical system are formed integrally with each other, so that the same straight line is scanned with the light from the LED chips of the three colors; a sub-scan drive system which moves the photosensitive material in a stepwise manner in a direction perpendicular to the main scanning direction per each main scanning operation; and spot-diameter adjusting means which adjust the spot diameter when a resolution of original image data and the previously determined resolution are different from each other.

In accordance with the first aspect of the present invention, usually, an image is recorded on a photosensitive material with a spot diameter corresponding to a previously determined resolution. However, when a resolution of input image data is different from the preset output-side resolution, the optical system is controlled by the spot-diameter adjusting means to vary the spot diameter. As a result, operating efficiency can be improved without interpolating or sampling the image data itself. Meanwhile, control of the optical system, for example, use of a zone focus applied as a zoom lens allows variation of the spot diameter without changing an optical length and a focal point.

A second aspect of the present invention is an image recording apparatus constructed such that it adjusts the spot-adjusting means in relation to the output timing of an image data signal of the main-scanning drive system and width of step movement of the sub-scan drive system.

In accordance with the second aspect of the present invention, when the spot diameter varies, the timing at which the image data signal is output changes in the main-scanning drive system and the width of step movement changes in the sub-scan drive system. For this reason, if automatic adjustment is allowed in such a manner that each degree of variation in the main-scanning drive system and the sub-scan drive system is provided to correspond to the spot diameter, the operating efficiency is improved still further.

Further, the degree of variation in each drive system may also be provided to correspond to the spot diameter which varies due to magnification or reduction ratio.

A third aspect of the present invention is an image recording apparatus as constructed above, wherein the preset resolution is the maximum resolution and only when the resolution of the original image data is lower than the above preset resolution, the spot diameter is adjusted by said spot-diameter adjusting means.

In accordance with the third aspect of the present invention, with the previously determined resolution being set as the maximum resolution, the recording apparatus can fully exhibit its abilities during ordinary image recording.

Further, only when the resolution of the original image data is lower than the preset resolution, the spot-diameter adjusting means adjusts the spot diameter. On the other hand, when the resolution of the original image data is higher than the preset resolution, the volume of the image data exceeds the ability at the output side, and therefore, the image data is sampled with certain intervals for recording as usual.

As a result, the image to be outputted is outputted constantly at the same resolution and a fixed image quality can be obtained irrespective of the original image data.

A fourth aspect of the present invention is an image recording method in an image recording apparatus, in which an original image is recorded on a photosensitive material by controlling light of three colors emitted from a light source in which LED chips of three colors each having a different light-emission peak wavelength are mounted onto a common substrate so that at least one LED chip provided for each of the three colors is arranged in a straight line, which method comprising the steps of: comparing a resolution of an inputted original image data signal and a preset maximum resolution of the image recording apparatus with each other; adjusting the spot diameter by spot-diameter adjusting means in such a manner as to move the optical system upwardly in a vertical direction with respect to the photosensitive material when a resolution of the original image data and the previously determined resolution are different from each other; moving, by a main scanning drive system which effects a scanning and driving operation with a transverse direction of the photosensitive material being set as a main scanning direction, a unit in which the light source and the optical system are formed integrally so that the same straight line is scanned with the light from the LED chips of the three colors; and moving the photosensitive material in a stepwise manner in a sub-scan direction after each main scanning operation by a sub-scan drive system which effects a scanning and driving operation in a sub-scan direction perpendicular to the main scanning direction.

BRIEF DESCRIPTION OF THE DRAWINGS

FIGS. 6A and 6B are each an optical model diagram of a telecentric lens system.

FIG. 7 is a characteristic view of a spot diameter and a lens position.

DESCRIPTION OF THE PREFERRED EMBODIMENTS

Figure 1:
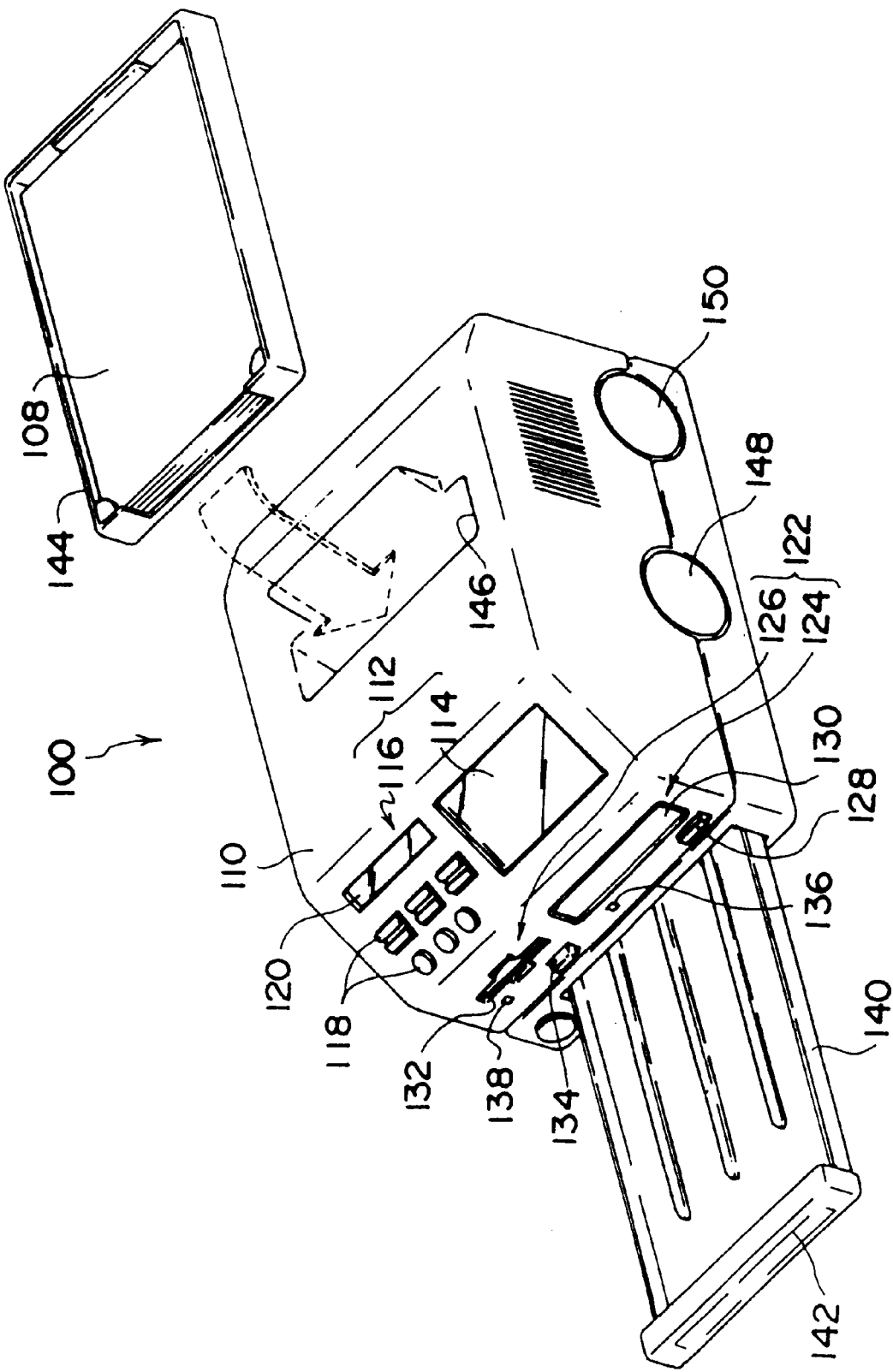
FIG. 1 is a perspective view of an image recording apparatus according to an embodiment of the present invention.
Figure 2:
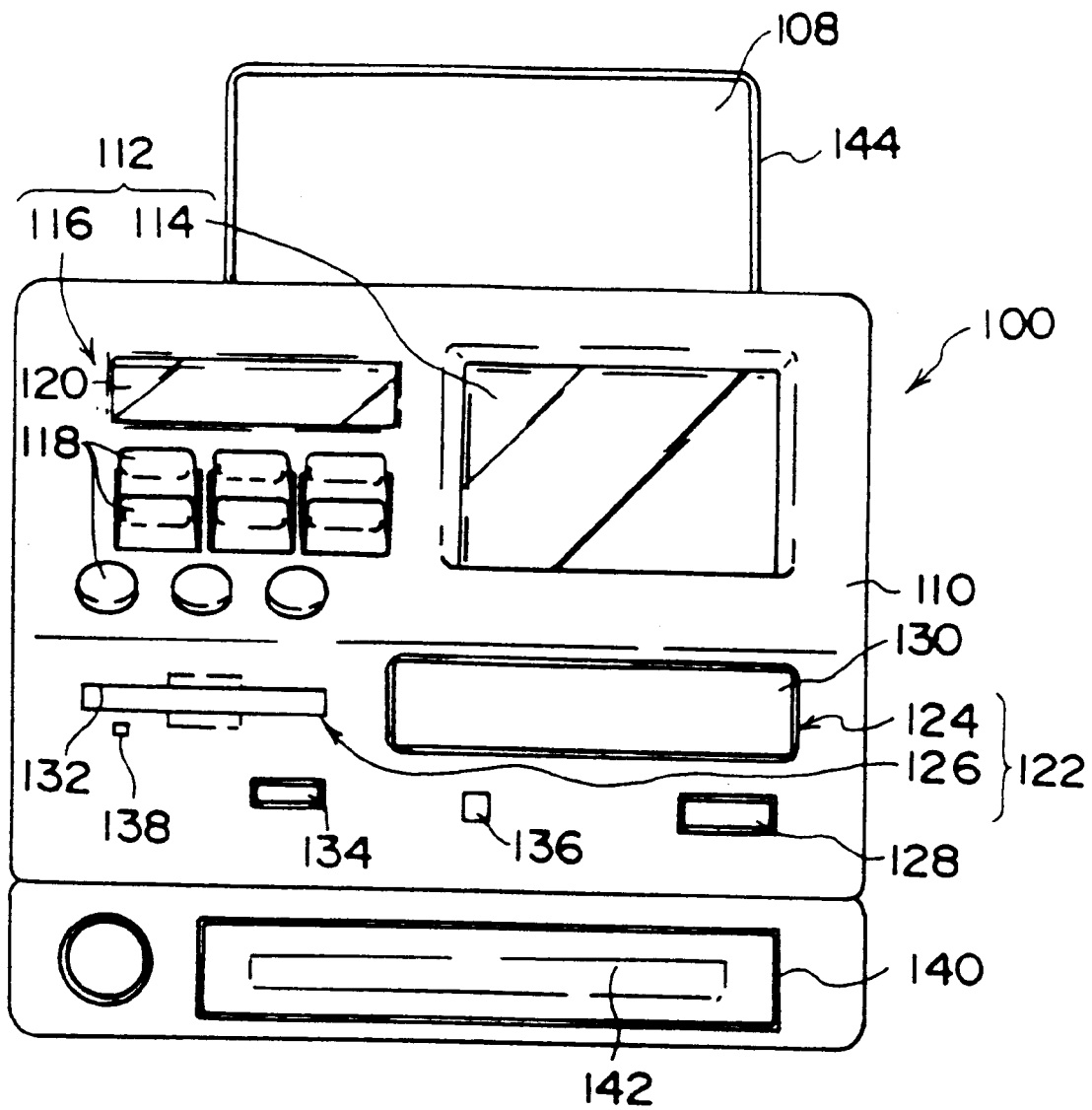
FIG. 2 is a front view of the image recording apparatus according to the embodiment of the present invention.
Figure 3:
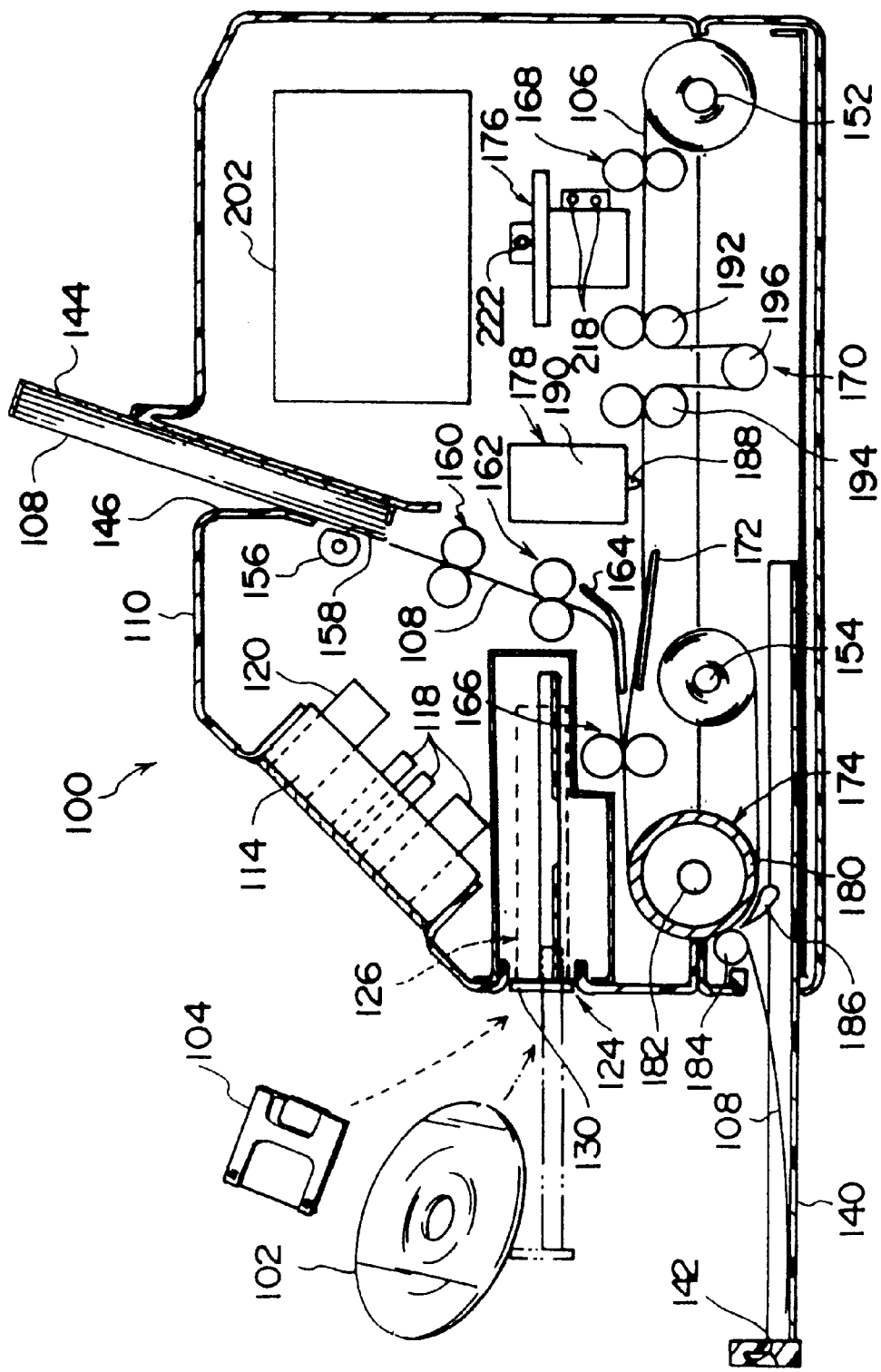
FIG. 3 is a cross-sectional side view showing an internal structure of the image recording apparatus according to the embodiment of the present invention.

Overall Structure (Exterior View):

Referring now to FIGS. 1 through 3, an image recording apparatus 100 according to a first embodiment of the present invention is shown therein.

The image recording apparatus 100 reads image data recorded on a CD-ROM 102 or an FD 104 (which are both shown in FIG. 3) to expose onto a photosensitive material 106, and transfers an image recorded on the photosensitive material 106 to an image receiving paper 108 and outputs the image receiving paper 108.

An upper portion of the front surface of a box-shaped casing 110 (at the left side on the paper of FIG. 3) is formed as an inclined surface and an operation indicating portion 112 is provided thereon.

As shown in FIG. 2, the operation indicating portion 112 is divided into a monitor portion 114 and an input portion 116 which are disposed at right and left sides, respectively. The monitor portion 114 allows projection of the read image thereon.

Further, the input portion 116 is formed by a plurality of operation keys 118 and a display portion 120 for confirmation of input data and allows input of data which is required for image recording, for example, the number of sheets to be recorded, size setting, color-balance adjustment, negative/positive selection, and the like.

A deck portion 122 is provided below the operation indicating portion 112. The deck portion 122 is formed by an optical-disk deck portion 124 and an FD deck portion 126 which are disposed at right and left sides, respectively, on the paper of FIG. 2.

The optical-disk deck portion 124 is provided in such a manner that a tray 130 can be opened and closed by pressing an open/close button 128. An optical disk 102 can be mounted in an interior of the apparatus in such a manner as to be placed on the tray 130.

An FD insertion throttle 132 is provided in the FD deck portion 126. When the FD 104 is inserted in the FD insertion throttle 132, a drive system within the apparatus is actuated to insert the FD 104 into the apparatus. Further, in order to take out the FD 104 from the FD deck portion 126, an operation button 134 is pressed to pull out the FD 104.

Further, access lamps 136, 138 are respectively provided for the optical disk deck portion 124 and the FD deck portion 126 and are provided to be turned on during access within the apparatus.

A discharge tray 140 is provided further below the deck portion 122. The discharge tray 140 is usually accommodated within the apparatus and is provided to be pulled out by an operator's finger being put on a holding portion 142 (see FIG. 1).

The image receiving paper 108 on which the image is recorded is discharged onto the discharge tray 140.

The image receiving paper 108 is previously accommodated on a tray 144 in a layered form. The tray 144 is mounted in a tray mounting hole 146 formed on an upper surface of the casing 110. The image receiving papers 108 are taken out one by one from the tray 144 mounted in the tray mounting hole 146, and after images are transferred onto the image receiving papers 108, these image receiving papers are guided to the discharge tray 140.

Two circular cover members 148, 150 are attached to the side surface of the casing 110 (toward the front side on the paper of FIG. 1). These cover members 148, 150 are each provided to be independently removable. As shown in FIG. 3, a take-up reel 154 and a feed reel 152 onto which the rolled photosensitive material 106 is wound are disposed within the apparatus along axial directions of the cover members 148, 150, respectively. These reels 152, 154 can be taken out from or loaded in the apparatus with the covers 148, 150 being removed.

Image Receiving Paper Conveying System:

As shown in FIG. 3, the tray 144 mounted in the tray mounting hole 146 is provided such that an upper surface of the leading end of the tray (at the side where the tray 144 is inserted into the tray mounting hole 146) faces a semicircular roller 156.

The semicircular roller 156 is formed with a part of the peripheral surface being cut out along a tangential line thereof. Usually, a cutting portion 158 faces an uppermost image receiving paper 108 within the tray 144 with a space formed therebetween. When the semicircular roller 156 rotates, the image receiving paper 108 of the uppermost layer and the peripheral surface of the semicircular roller 156 contact each other, and the image receiving paper 108 is pulled out by a small amount each time the semicircular roller 156 makes one rotation. The pulled-out image receiving paper 108 is nipped between a first roller pair 160 and is completely pulled out from the tray 144 by driving force of the first roller pair 160.

A second roller pair 162, a guide plate 164, and a third roller pair 166 are sequentially disposed at the downstream side of the first roller pair 160. The image receiving paper 108 is, after having been nipped by the first roller pair 160, nipped by the second roller pair 162, guided by the guide plate 164, and further nipped by the third roller pair 166.

The image receiving paper 106 overlaps with the photosensitive material 106 at the third roller pair 166. Namely, the third roller pair 166 is also used as a conveying path of the photosensitive material 106.

Photosensitive Material Conveying System:

The photosensitive material 106 is accommodated in the apparatus in a state of being elongated and wound onto the feed reel 152 in a layered form. The feed reel 152 is mounted at a predetermined position in such a manner that the cover member 150 (at the rear side of the apparatus) is removed and the feed reel 152 is inserted into the apparatus in the axial direction thereof.

With the photosensitive material 106 being mounted at the predetermined position, loading is effected along a predetermined conveying path with an outermost layer of the photosensitive material 106 being set as pull-out initialization. The loading of the photosensitive material 106 is effected in such a procedure that the outermost layer thereof is pulled out from the feed reel 152, nipped by a fourth roller pair 168 in the vicinity of the feed reel 152, conveyed through a reservoir portion 170 and a guide plate 172, and is nipped by the third roller pair 166, and thereafter, the outermost layer is sequentially entrained onto a heat roller 174 and a take-up reel 154. In this case, a leader tape having a length required for loading may be provided at the leading end portion of the photosensitive material 106 wound onto the feed reel 152.

On the conveying path of the photosensitive material 106, an exposure section 176 is provided between the fourth roller pair 168 and the reservoir portion 170. Further, a water applying portion 178 is provided between the reservoir portion 170 and the guide plate 172. The exposure section 176 and the water applying portion 178 will be described later in detail. After the image has been exposed onto the photosensitive material 106 in the exposure section 176, the photosensitive material 106 is provided to overlap with the image receiving material 108 at the third roller pair 166 in a state in which water is applied to an emulsion surface (i.e., a surface to be exposed) of the photosensitive material.

Heat Roller:

The heat roller 174 serves as a heat development-transfer section of the apparatus according to the present invention and is formed by a cylindrical roller main body 180 and a heater 182 provided within the roller main body 180 along the axial direction of the roller. The heat roller 174 serves to apply heat for members wound onto the roller main body 180 (i.e., the photosensitive material 106 and the image receiving material 108) in such a manner that the surface of the roller main body 180 is heated by actuation of the heater 182. The heating of the heat roller 174 allows heat development-transfer processing and the image recorded on the photosensitive material 106 is thereby transferred onto the image receiving paper 108.

A peeling roller 184 and a peeling claw 186 are disposed in the vicinity of a lower right side of the heat roller 174 and are provided to separate from the photosensitive material 106 the image receiving paper 108 wound onto the heat roller 174 by a length of about one third the overall circumference of the heat roller 174 to guide the image receiving paper 108 toward the discharge tray 140.

On the other hand, the photosensitive material 106 is wound onto the heat roller 174 by a length of about a half the overall circumference of the heat roller and is turned to an opposite direction to be guided to a position where the take-up reel 154 is mounted.

Water Applying Portion:

As shown in FIG. 3, the water applying portion 178 operates to apply water, serving as an image forming solvent, onto the photosensitive material 106 or the image receiving paper 108 to allow overlapping surfaces of the photosensitive material 106 and the image receiving paper 108 to closely adhere to each other for heat development. The water applying portion 178 is formed by an applying member 188 extending along a transverse direction of the photosensitive material 106 and a tank 190 in which water is filled.

The applying member 188 is formed of a high absorptive material, for example, felt or sponge, having a proper degree of hardness and is provided to contact the photosensitive material 106 at a predetermined pressure during conveying of the photosensitive material 106. Water filled in the tank 190 is constantly supplied to the applying member 188 by a proper amount by taking advantage of capillary phenomenon. When the photosensitive material 106 and the applying member 188 contact each other, water is applied onto the surface (i.e., the emulsion surface) of the photosensitive material 106 by the applying member 188.

Further, since the applying member 188 abuts against the photosensitive material 106 at a proper pressure, water is uniformly applied to the photosensitive material 106.

Replenishment of water into the tank 190 is effected in such a manner that the entire water applying portion 178 is removed from the apparatus, but water may be constantly supplied from an exterior of the apparatus by using a pipe arrangement.

Meanwhile, in the present embodiment, water is used as the image forming solvent, but the water used in this embodiment is not limited to pure water and includes water which is widely and generally used. Further, a mixed solvent of water and a low-boiling-point solvent such as methanol, DMF, acetone, diisobutylketone, or the like may be used. Moreover, a solution which contains an image formation accelerator, an anti-fogging agent, a development stopping agent, hydrophilic heat solvent, or the like may also be used.

Figure 4:
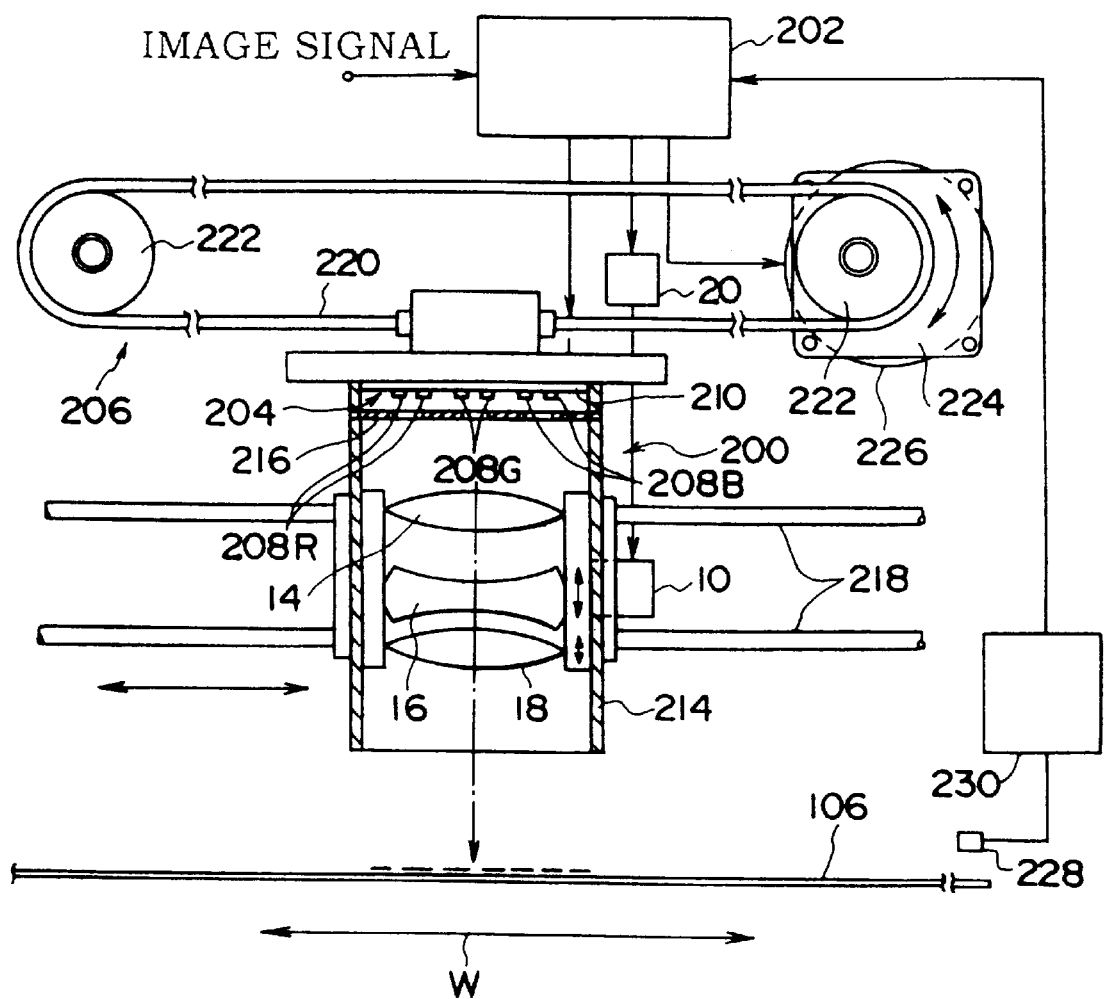
FIG. 4 is a front view showing a schematic structure of an exposure section.

Exposure Section:

FIG. 4 shows an exposure section 176 according to the present embodiment.

The exposure section 176 is mainly formed from a light source unit 200 provided above the conveying path of the photosensitive material 106 and is connected to a controller 202. An image signal (the image signal read from the optical disk 102 or FD 104) is stored in the controller 202 and a light source portion 204 within the light source unit 200 is turned on in accordance with the image signal. The light source unit 200 is provided to be movable in the transverse direction of the photosensitive material 106 (i.e., the main scanning direction) in such a manner as to be driven by a main scanning unit 206, which will be described later. The main scanning is effected when the photosensitive material 106 stops during step drive in the exposure section 176.

The light source unit 200 of the exposure section 176 is covered by a box-shaped exposure casing 214. The light source portion 204 is disposed on the upper end surface of the exposure casing 214 and a light emission surface of the light source portion 204 is directed toward an interior of the exposure casing 214. An aperture 216 is provided on the side of the light emission surface of the light source portion 204 to limit scattering of light from a plurality of LED chips 208. Meanwhile, the structure having no aperture 216 may also be used in the present invention.

A telecentric lens 212 serving as an optical system is provided on the downstream side of the aperture 216 and at the central portion of the exposure casing 214 and serves to converge light from the light source portion 204 to form an image on the photosensitive material 106. Meanwhile, the resolution of light for image formation is about 250 to 400 dpi.

The telecentric lens 212 is formed by a plurality of lenses and a diaphragm and has characteristics in which magnification thereof does not vary even when the height of an image surface changes. The telecentric lens 212 can eliminate a difference in magnification, which occurs during the main scanning movement by the main scanning unit 206 or which is caused by a state in which the exposure casing 214 is mounted.

Some of lenses which form the telecentric lens system 212 (refer to FIGS. 6A, 6B) are, as shown in FIG. 4, provided such that the positions thereof can be varied in a direction along an optical axis by the pulse motor 10. Due to the movement of these lenses, an image-forming spot diameter on the photosensitive material 106 is varied. The spot diameter is varied in accordance with a resolution of input image data.

When the resolution of the input image data is lower than that previously determined in the present embodiment, usually, image data is interpolated to increase the volume of data, and is then recorded. However, in the present embodiment, the previously determined resolution is varied and recorded in such a manner that the volume of image data remains unchanged and the image-forming spot diameter is made larger.

Namely, with reference to the optical model diagrams shown in FIGS. 6A and 6B (which each show, in simplified manner, the optical system of the present embodiment), light from the light source 12 (i.e., the light source portion 204 in the present embodiment) is made incident on a convex lens 14 so as to be made into parallel light, and is changed to diffused light by a concave lens 16, and is further imaged on the photosensitive material 106 by a convex lens 18. At this time, assuming that the image-forming spot diameter on the photosensitive material 106 is given as "a" (see FIG. 6A), since the spot diameter "a" depends upon the distance "La" between the convex lens 18 and the photosensitive material 106, it suffices that the convex lens 18 is moved toward the light source 12 so that the spot diameter is set at "b" which is larger than "a" (b>a) (see FIG. 6A). However, at this time, the focal length is not fixed. For this reason, the concave lens 16 is moved in accordance with an amount the convex lens 18 moves so that an image-forming point is definitely located on the photosensitive material 106. Accordingly, the image-forming spot diameter "b" corresponding to the distance Lb can be obtained on the photosensitive material 106. It is to be noted that these optical model diagrams may be applied as they are, but a combination of a plurality of lenses may also be provided in accordance with the size of the light source unit 204 or a lens to be selected.

As shown in FIG. 4, the above-described pulse motor 10 is connected to the controller 202 via the driver 20. The image data signal is inputted to the controller 202. The controller 202 analyzes the input image data signal to obtain the resolution therefrom.

Further, in the controller 202, the maximum resolution in the image recording apparatus according to the present embodiment is previously set. The controller 202 compares the resolution of the input image data and a previously set resolution with each other and determines an amount by which the pulse motor 10 drives (including the direction in which the pulse motor 10 drives). Meanwhile, although respective amounts of movement of the convex lens 18 and the concave lens 16, which are driven by the pulse motor 10, are different from each other, the convex lens 18 and the concave lens 16 are provided to move at a fixed gear ratio.

The light source portion 204 is supported by a pair of guide shafts 218 disposed parallel to each other and forming a part of the main scanning unit 206. These guide shafts 218 are provided along the transverse direction of the photosensitive material 106 (i.e., the direction indicated by arrow W in FIG. 4). The light source portion 204 is guided by the guide shafts 218 so as to be movable in the transverse direction of the photosensitive material 106.

A portion of an endless timing belt 220 is fixed at the exposure casing 214 of the light source portion 204. The timing belt 220 is entrained onto sprockets 222 positioned in the vicinities of both ends of the pair of guide shafts 218. The rotating shaft of one of the sprockets 222 is connected via a transmission 224 to the rotating shaft of a stepping motor 226. Due to reciprocating rotation of the stepping motor 226, the light source portion 206 is moved along the guide shafts 218 in a reciprocating manner.

The drive of the stepping motor 226 is controlled by the controller 202 and is synchronized with the step driving of the photosensitive material 106. Namely, in the state in which the photosensitive material 106 stops after one step movement, the stepping motor 226 starts rotating to move the light source portion 204 on the photosensitive material 106 along the transverse direction of the photosensitive material 106. When the stepping motor 226 is rotated in the reverse direction after having confirmed a predetermined number of pulses, the light source portion 204 returns to its original position. Subsequent movement of the photosensitive material 106 starts synchronously with the returning motion of the light source portion 204.

Further, the controller 202 allows setting of data output timing in accordance with a variation in the image-forming spot diameter.

Namely, the output timing of data per each dot is varied such that a solution of "spot diameter"ד"number of dots" (i.e., the distance of movement in the main scanning direction) becomes fixed.

A photodiode 228 is provided at the side where light is emitted from the light source portion 204 to face the photosensitive material 106 and outputs a signal corresponding to a quantity of light from the light source portion 204. The photodiode 228 is connected to a light-quantity correction unit 230 and the above signal is inputted to the light-quantity correction unit 230.

The light-quantity correction unit 230 compares respective quantities of light from the LED chips 208 of each of the detected colors to adjust density and color balance, and also outputs a correction value to the controller 202. The image signal to be transmitted to the light source portion 204 is corrected based on the correction value and each LED chip 208 is turned on at a proper quantity of light.

Figure 5:
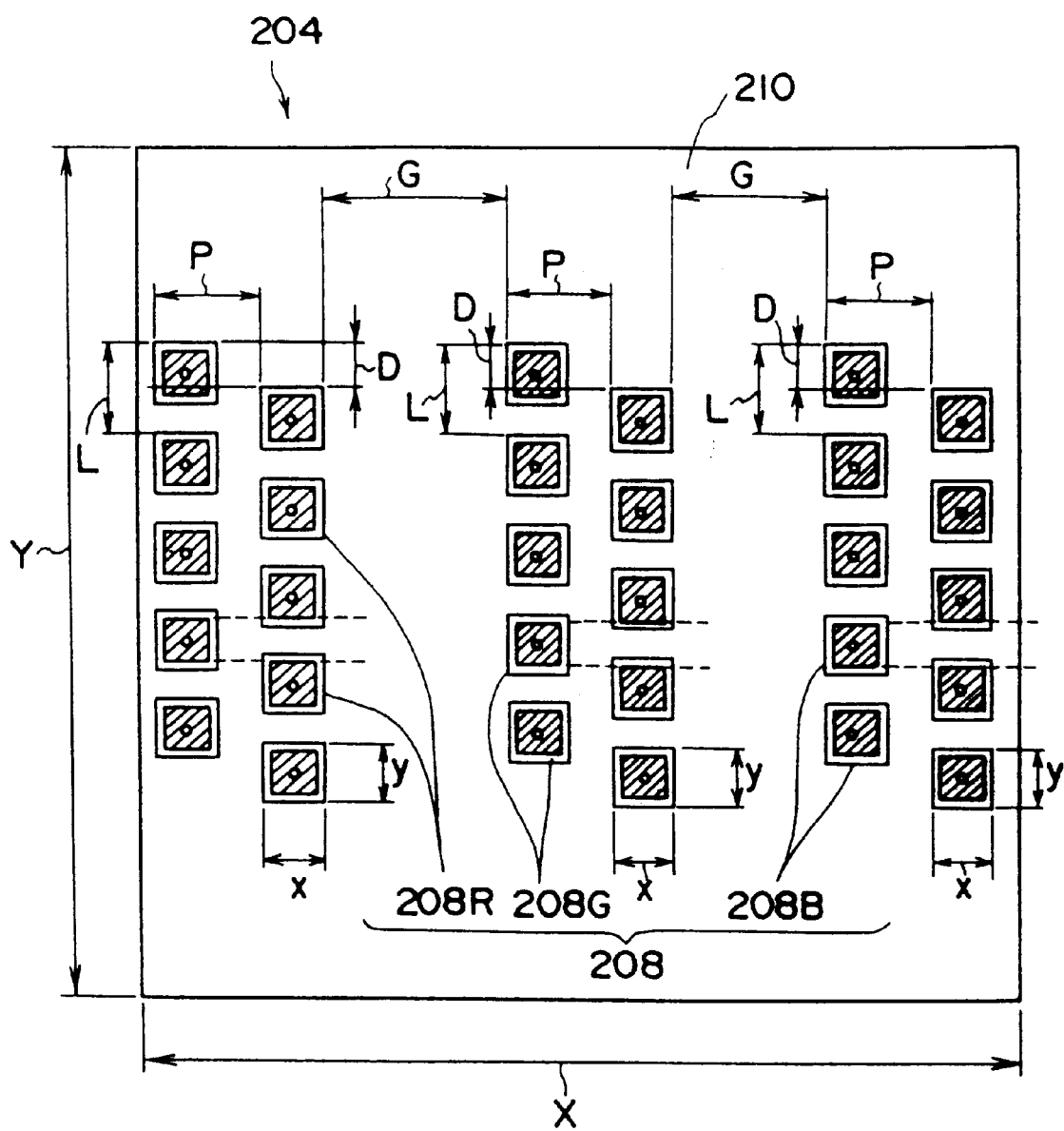
FIG. 5 is a plan view showing a light source portion of the exposure section.

As shown in FIG. 5, the light source portion 204 is formed with the plurality of LED chips 208 being arranged in groups. These LED chips 208 which emit light of colors of blue (B), green (G), and R (red) (when described below for each of the colors, the LED chip which emits light of blue is referred to as B-LED chip 208B, the LED chip which emits light of green is referred to as G-LED chip 208G, and the LED chip which emits light of red is referred to as R-LED chip 208R) are mounted onto a substrate 210 along the transverse direction of the photosensitive material 106 (i.e., the main scanning direction) in accordance with the same arrangement rule. Meanwhile, the wavelength of light from the R-LED chip 208R is 650±20 nm, the wavelength of light from the G-LED chip 208G is 530±30 nm, and the wavelength of light from the B-LED chip 208G is 470±20 nm.

On the substrate 210 in the plan view shown in FIG. 5, ten B-LED chips 208B are arranged in two rows and in a zigzag manner at the right end, ten R-LED chips 208R are arranged in two rows and in a zigzag manner at the left end, and ten G-LED chips 208G are arranged in two rows and in a zigzag manner at the central position. Namely, the totaled six rows of LED chips 208 are arranged.

A predetermined wiring arrangement is provided on the substrate 210 by etching processing or the like and the substrate 210 is covered by metal for heat dissipation so as not to cause a short circuit between these wires. For this reason, generation of heat due to the LED chips 208 being turned on can be restricted and variation of an amount by which light is emitted can also be limited.

The dimensions of each of parts of the light source portion 204 applied to the present embodiment are as follows.

The horizontal and vertical dimensions (X, Y) of the substrate 210 are 5×5 mm (maximum) and the dimensions of each LED chip 208 (x×y) are about 360×360 $\mu$m. The row pitch P of the same color LED chips is 600 $\mu$m, the line pitch L of each row of the LED chips is 520 $\mu$m, and the distance D of a stepped portion formed in the zigzag arrangement along the vertical direction of the substrate is 260 $\mu$m. The distance G of a space between the adjacent groups of LED chips cannot be determined univocally, but is determined by the telecentric lens system 212. Preferably, the respective distances G between the R-LED chips 208R and the G-LED chips 208G and between the G-LED chips 208G and the B-LED chips 208B are equal to each other.

The diagonal line section of each of the LED chips 208 shown in FIG. 5 is a region from which light is actually emitted. As shown in the diagonal lines shown in FIG. 5, borders of the light emission region in the adjacent rows of LED chips are provided to coincide with each other.

The light source portion 204 having the above-described structure allows recording of ten main scanning lines by one main scanning operation for each of the colors. For this reason, step movement of the photosensitive material 106 in the sub-scanning direction is controlled such that the photosensitive material 106 is driven and stopped repeatedly at a pitch of ten times the width of a main scanning line recorded thereon.

Reservoir Portion:

The reservoir portion 170 is, as described above, disposed between the exposure section 176 and the water applying portion 178 and is formed by two pairs of nip rollers 192, 194 and one dancer roller 196. The photosensitive material 106 is entrained between the two pairs of nip rollers 192, 194 and a substantially U-shaped slack portion is formed in the photosensitive material 106 between the pairs of nip rollers. The dancer roller 196 is provided to move up and down correspondingly to the slack portion so as to hold the slack portion of the photosensitive material 106.

In the exposure section 176, the photosensitive material 106 moves in a stepwise manner, but in the water applying portion 178, it is necessary that the photosensitive material 106 be conveyed at a fixed speed so as to allow uniform application of water onto the photosensitive material 106. For this reason, the difference in the conveying speed of the photosensitive material 106 is generated between the exposure section 176 and the water applying portion 178. In order to eliminate the difference in the conveying speed, the dancer roller 196 is moved up and down to adjust an amount of slack formed in the photosensitive material 106 so that the stepwise movement and the constant-speed movement of the photosensitive material 106 can thereby be effected synchronously.

Next, an operation of the present embodiment will be described.

An overall flow of an image recording operation will be first described.

In the state of loading being completed in which the tray 144 is mounted at the tray mounting hole 146 and the feed reel 152 onto which the photosensitive material 106 is completely taken up and the take-up reel 154 which is in an empty state are mounted at respective predetermined positions, when a printing start key of the operation indication portion 112 is operated, the controller 202 reads and stores image data from the optical disk 102 or the FD 104.

When image data is inputted to the controller 202, the controller 202 obtains the resolution of the inputted image data and compares it with the previously set resolution. On the basis of the result of this comparison, some of the lenses of the light source portion 204 are moved in the direction along the optical axis. The movement of these lenses is, as shown in FIGS. 6A and 6B, determined in accordance with the beam diameter. Namely, in order to enlarge the beam diameter, the distance between the convex lens 18 and the photosensitive material 106 is made longer and the concave lens 16 is moved to form an image on the photosensitive material 106 in accordance with a variation of the distance between the convex lens 18 and the photosensitive material 106.

After completion of the above-described setting, the feed reel 152 is driven to start conveying the photosensitive material 106.

When the photosensitive material 106 reaches a predetermined position in the exposure section 176, the photosensitive material 106 is stopped temporarily and an image signal is outputted from the controller 202 to the light source portion 204. The image signal is outputted every ten lines and the light source portion 204 is guided by the guide shaft 218 by driving of the stepping motor 226 to move along the transverse direction of the photosensitive material 106 (main scanning). As a result, images of ten lines can be recorded.

Figure 8A:
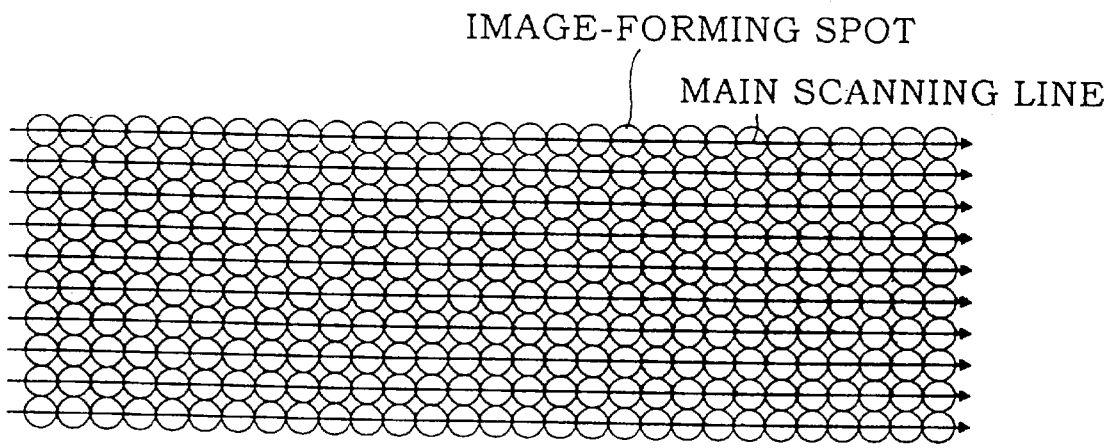
FIGS. 8A and 8B are each a plan view showing a spot diameter of dots, which changes due to the difference of resolution recorded on a photosensitive material.
Figure 8B:
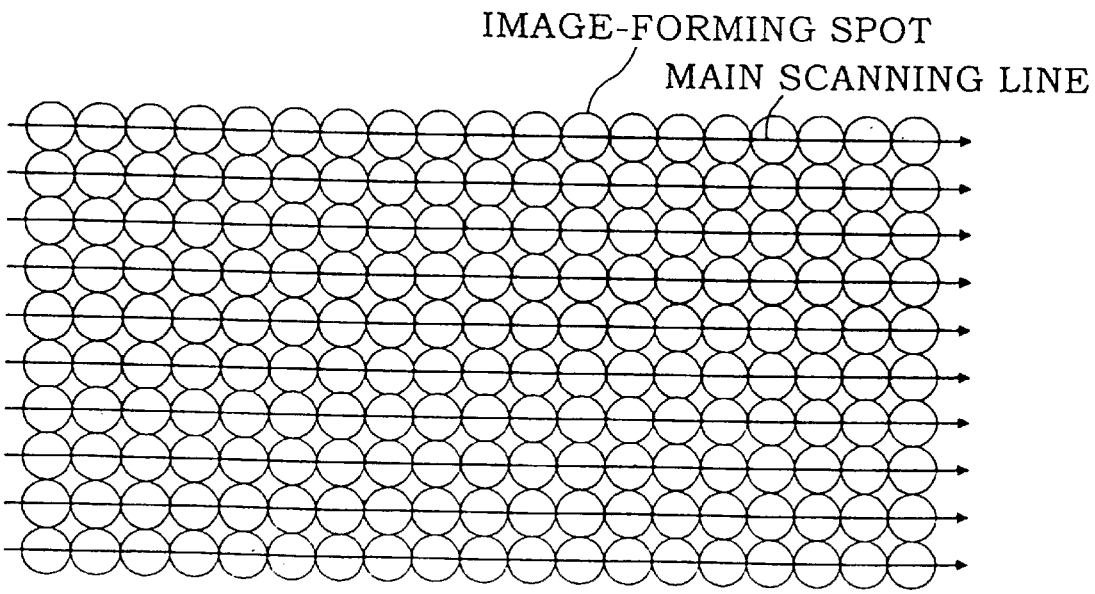

FIG. 8A shows imaging spots each having a diameter of "a" and FIG. 8B shows imaging spots each having a diameter of "b". When these imaging spots are compared, it can be seen that these imaging spots have different resolutions.

Prior to output of the image signal, the quantity of light for each of the colors from the light source portion 204 is detected by the photodiode 228, and in the light-quantity correction unit 230, a correction value for adjusting density, color balance, and the like is supplied to the controller 202, to thereby correct the image signal. The correction value is provided for each image.

When first main scanning is completed, the photosensitive material 106 is moved for one step (10-line pitch) and stops, and subsequently, second main scanning is effected. By repeating the above main scanning, an image of one frame is recorded on the photosensitive material 106. The photosensitive material 106 on which the image has been recorded is held by drive of only upstream side nip roller pair 192 in the reservoir portion 170 (a downstream side nip roller pair 194 is stopped) in the state of having a slack portion in the reservoir portion 170 to be entrained onto the dancer roller 196. For this reason, the above photosensitive material 106 is not provided to reach the water applying portion 178.

When the photosensitive material 106 having a length of one image is accumulated in the reservoir portion 170, the nip roller pair 194 at the downstream side of the reservoir portion 170 starts driving. As a result, the photosensitive material 106 (recording of images thereon has been completed) is conveyed to the water applying portion 178. In the water applying portion 178, the photosensitive material 106 is conveyed at a constant speed and water is uniformly applied to the photosensitive material by the applying member 188.

Water is constantly conveyed from the tank 190 to the applying member 188 and the photosensitive material 106 is pressed by the applying member 188 at a predetermined pressure. For this reason, a proper amount of water is applied to the photosensitive material 106.

The photosensitive material 106 to which water is applied is guided by the guide plate 172 and conveyed to the third roller pair 166.

On the other hand, the peripheral surface of the semicircular roller 156 and the leading end of the image receiving paper 108 contact each other due to one rotation of the semicircular roller 156, and the image receiving paper 108 of the uppermost layer is pulled out and is nipped by the first roller pair 160. The image receiving paper 108 waits for arrival of the photosensitive material 106 in the state of being pulled out from the tray 144 by being driven by the first roller pair 160 and nipped by the second roller pair 162.

Synchronously with the passing of the photosensitive material 106 through the guide plate, the first roller pair 160 and the second roller pair 162 start driving so that the image receiving paper 108 is guided by the guide plate 164 and conveyed to the third roller pair 166.

The photosensitive material 106 and the image receiving paper 108 are nipped by the third roller pair 166 in an overlapping state and are conveyed to the heat roller 174. At this time, the photosensitive material 106 and the image receiving paper 108 closely adhere to each other by water applied to the photosensitive material 106.

The photosensitive material 106 and the image receiving paper 108 in the overlapping manner are entrained onto the heat roller 174 and is subjected to heat from the heater 182 for heat development-transfer processing. In other words, the image recorded on the photosensitive material 106 is transferred onto the image receiving paper 108 so as to form an image on the image receiving paper 108.

The heat development-transfer processing is completed in the state in which the image receiving paper 108 is wound onto the heat roller 174 by a length of about one third the entire circumference of the roller, and subsequently, the image receiving paper 108 is separated from the photosensitive material 106 by the peeling roller 184 and the peeling claw 186, and is discharged onto the discharge tray 140 in the state in which it is wound onto the peeling roller 184.

On the other hand, the photosensitive material 106 is wound onto the heat roller 174 by a length of about a half the overall circumference of the roller, and thereafter, the photosensitive material 106 moves in the tangential direction to be wound onto the take-up reel 154.

The present embodiment is provided such that the optical-disk deck portion 124 and the FD deck portion 126 are loaded in the apparatus, but a deck portion in which other recording medium (for example, a photomagnetic disk (MO), a phase-change disk (PD), a video tape, and the like) can be loaded may also be provided. Further, an image input terminal which is used to take in an image signal from an exterior (for example, a personal computer, a television, and the like) can also be provided.

Further, in the present embodiment, each main scanning operation for ten lines is effected synchronously, and therefore, the step movement in the sub-scan direction is effected at ten-line width shown in FIG. 8B. When the main scanning operation is effected per each of the lines, the width of sub-scan is varied in accordance with the resolution. Namely, the lower the resolution is, the wider the width of sub-scan may be made.

As described above, the image recording apparatus according to the present invention allows output of image data without change when each resolution of input image data and image data to be outputted is different and also can reduce a processing time and improve operating efficiency.

What is claimed is:

1. An image recording apparatus in which an image is recorded on a photosensitive material by controlling emission of light of three colors from a light source with an image data signal, comprising:

the light source being composed of LED chips of three colors each having a different wavelength, said LED chips being mounted onto a common substrate in a form of a straight line including one or more than one LED chips of each of said three colors therein;

an optical system for forming an image of the light from the LED chips of the three colors, with a spot diameter corresponding to a preset resolution on the photosensitive material;

a main scanning drive system which moves a unit, in which said light source and said optical system are formed integrally with each other, so that the same straight line is scanned with the light from the LED chips of the three colors;

a sub-scan drive system which moves the photosensitive material in a stepwise manner in a direction perpendicular to the main scanning direction per each main scanning operation; and a spot-diameter adjustor including a controller which controls said optical system to adjust the spot diameter when a resolution of original image data and the previously determined resolution are different from each other, such that the spot diameter is adjusted in relation to an output timing of the image data signal of said main scanning drive system and a step width of said stepwise movement of said sub-scan drive system.

2. An image recording apparatus according to claim 1, wherein said optical system is a telecentric lens system includes a first convex lens, a second convex lens, and a concave lens disposed between the first and second convex lenses and said spot-diameter adjustor further includes a drive motor which freely moves the second convex lens in a range of distance to the photosensitive material and allows the concave lens to move correspondingly.

3. An image recording apparatus according to claim 2, wherein the second convex lens and the concave lens driven by the drive motor are controlled so as to move in a direction in which they move away from the photosensitive material such that the image of the light from the LED chips of the three colors is focused on the photosensitive material.

4. An image recording apparatus according to claim 1, wherein the previously determined resolution is the maximum resolution and only when the resolution of the original image data is lower than the previously determined resolution, the spot diameter is adjusted by said spot-diameter adjuster.

5. An image recording apparatus according to claim 1, wherein said light source is formed in such a manner that the LED chips of the three colors, apart from those arranged in one row, are provided also in a direction perpendicular to said one row of the LED chips in a plurality of rows at equal intervals.

6. An image recording apparatus according to claim 5, wherein the LED chips of the three colors which are provided in a plurality of rows at equal intervals in the direction perpendicular to said one row of the LED chips of the three colors are arranged in a zigzag manner.

7. An image recording apparatus according to claim 6, wherein the LED chips disposed adjacently in the direction perpendicular to those arranged in the one row are each provided with a zigzag-like stepped portion so that borders of regions from which light is emitted coincides with each other.

8. An image recording method in an image recording apparatus, in which an original image is recorded on a photosensitive material by controlling light of three colors emitted from a light source in which LED chips of three colors each having a different wavelength are mounted onto a common substrate so that at least one LED chip provided for each of the three colors is arranged in a straight line, said method comprising the steps of:

comparing an inputted original image data signal and a previously determined maximum resolution of the image recording apparatus with each other;

adjusting a spot diameter in such a manner as to move an optical system of the image recording apparatus upwardly in a vertical direction with respect to the photosensitive material when a resolution of the original image data and the preset resolution are different from each other;

moving, with a transverse direction of the photosensitive material being set as a main scanning direction, said light source and said optical system in the main scanning direction so that the same straight line is scanned with the light of three colors emitted from the LED chips of the three colors; and moving the photosensitive material in a stepwise manner per each main scanning operation in a sub-scan direction perpendicular to the main scanning direction, wherein a timing of said moving of said light source and said optical system in said main scanning direction, and a width of movement, in a sub-scan direction, of the photosensitive material are set in relation with said adjusting of the spot diameter.

9. An image recording method according to claim 8, wherein said adjusting of the spot diameter is effected only when the resolution of the original image data signal is lower than the preset resolution.

10. An image recording method according to claim 8, wherein said adjusting of the spot diameter is effected in such a manner that a convex lens disposed at a position near the photosensitive material and a concave lens disposed above the convex lens in a telecentric lens system which forms the optical system are moved upwardly in the vertical direction with respect to the photosensitive material so that said light of three colors is focused on the photosensitive material.

* * * * *